United States Patent [19]

Sterling

[11] 3,976,931

[45] Aug. 24, 1976

[54] AC REGULATOR
[75] Inventor: Kermit Karold Sterling, Plano, Tex.
[73] Assignee: Texas Instruments Incorporated, Dallas, Tex.
[22] Filed: Feb. 3, 1975
[21] Appl. No.: 546,248

[52] U.S. Cl. .................................. 321/18
[51] Int. Cl.² ................................ H02M 7/217
[58] Field of Search ....................... 321/18, 47

[56] References Cited
UNITED STATES PATENTS

| | | | |
|---|---|---|---|
| 3,065,399 | 11/1962 | McNamee | 321/18 |
| 3,514,689 | 5/1970 | Giannamore | 321/18 X |
| 3,679,959 | 7/1972 | Beesley et al. | 321/47 |

Primary Examiner—William M. Shoop
Attorney, Agent, or Firm—Harold Levine; Rene E. Grossman; Alva H. Bandy

[57] ABSTRACT

Disclosed is a three phase AC power regulator using a single power modulating element. The element may be operated class A or in switching mode. A transformer primary is connected in Y configuration with the common junction being made through a 6 diode bridge and the single control element. The single control element thereby controls the common current in all three sections of the transformer primary. The transformer secondary windings are coupled to a second 6 diode bridge to produce a DC voltage level which is fed back to drive the control element.

5 Claims, 2 Drawing Figures

AC REGULATOR

This invention relates to AC power regulators and more particularly to a regulator for controlling the output of the secondary of a multiphase transformer.

Nearly all electronic systems require one or more DC voltage sources. In complex systems such as radars and radio frequency transmitters, a plurality of voltage sources is required to provide power for both low voltage solid state circuitry and high voltage tube circuits. These power sources typically comprise: a transformer for converting an available AC voltage level to the needed voltage range, a full wave rectifier, ripple filter and a voltage regulator. It it difficult to build a voltage regulator where high regulated voltages are required for tube circuits such as transmitters. A common solution to this problem is to build a low voltage power source comprising all the elements mentioned above, plus means for adjusting the regulated voltage. A chopper circuit is then provided to convert the regulated DC voltage to AC which is then converted to high voltage through a second transformer and rectified and filtered without any further regulation. The high voltage output is then sampled and compared to a reference to generate a feedback signal which is used to adjust the regulated low voltage supply. Thus, it is seen that many high voltage power sources require a complete regulated low voltage power source to simply provide the input to the high voltage power supply. The power therefore passes through two transformers with inherent losses before it is ever used. In many systems even more power conversions are required between the actual power generator and the load being supplied. Since each power conversion usually requires a transformer such conversions are particularly bad in airborne systems where weight must be minimized. Each power conversion results in some power loss and therefore results in larger power generator requirements.

Accordingly, an object of the present invention is to provide an improved AC regulator for controlling the output power from a multiphase transformer.

Another object of the present invention is to provide an AC regulator for controlling the output voltage of a voltage source having only one transformer power conversion.

Yet another object of the present invention is to provide a simple and inexpensive AC power regulator.

The above and other objects are achieved by providing a multiphase transformer having a common connection of primary windings made through a full wave diode rectifying bridge and a DC modulator. All current flowing from one primary winding to another is rectified by the diode bridge and must flow through the modulator. The single modulator therefore controls the current in all primary windings and thereby controls the output of the transformer secondary windings. The modulator limits primary winding current flow in response to an electrical input signal.

Other objects, features and advantages of this invention will become better understood by reference to the following detailed description when read in conjunction with the accompanying drawings wherein.

Figure 1:
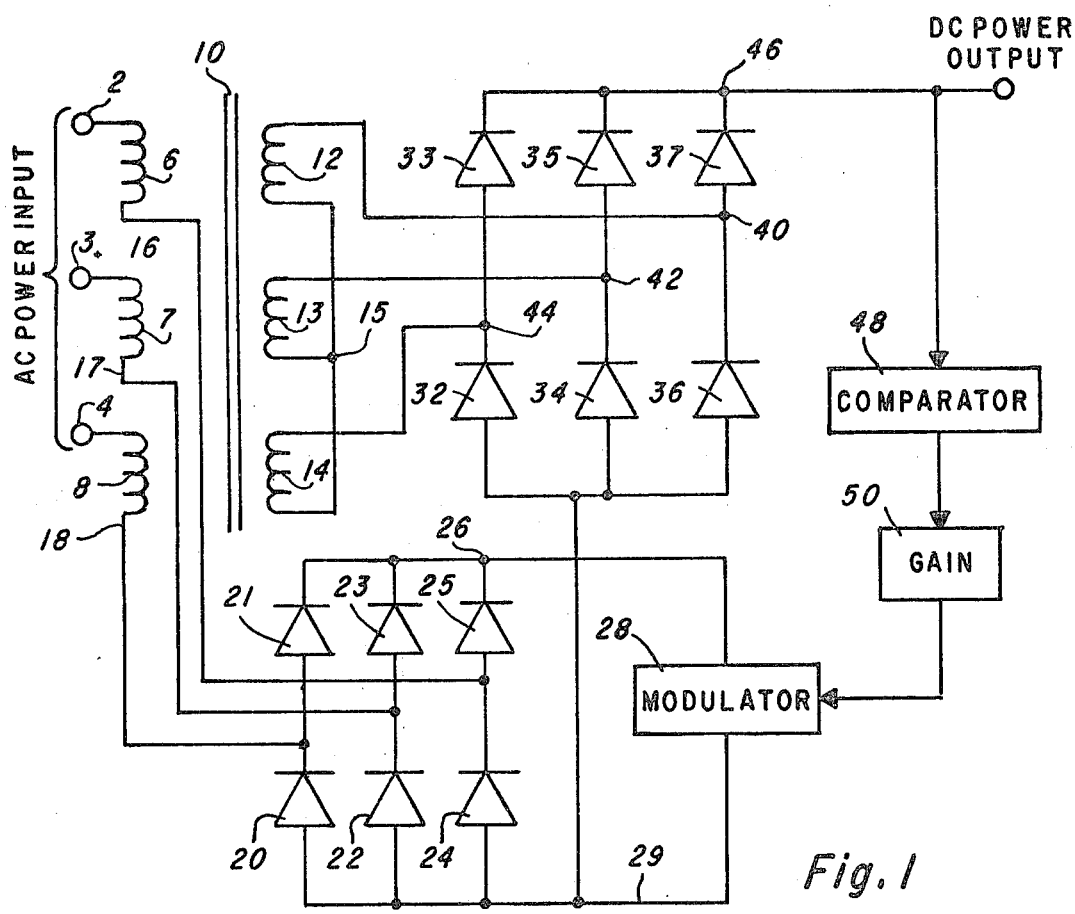
FIG. 1 is a schematic diagram of the present invention with a feedback network shown in block diagram form.

FIG. 1 illustrates in partial block diagram form a DC power supply having a three phase AC input and an AC regulator according to the present invention. A three phase transformer has three primary windings 6, 7, and 8, a core 10 and three secondary windings 12, 13, and 14. Although the preferred embodiment employs a single core transformer, this three phase transformer may be formed of three single phase transformers properly interconnected. Three phase power from an AC generator, not shown, is coupled to inputs 2, 3 and 4 which are one end of primary windings 6, 7 and 8, respectively. In a typical Y connected three phase transformer primary, the other ends 16, 17 and 18 of primary windings 6, 7 and 8, respectively, would be connected together to form a common junction. According to the present invention the interconnection of primary winding ends 16, 17 and 18 is made through a full wave rectifying bridge comprising diodes 20 through 25 and a DC modulator 28. The diodes 20-25 allow current to flow between any of the primary windings 6, 7 and 8 but force all such current to flow through modulator 28 in a single current direction thereby allowing modulation of this current by a DC modulator such as a transistor. Thus, if end 16 of primary winding 6 is positive and ends 17 and 18 of primary windings 7 and 8, respectively, are negative with respect to ground potential, current from winding 6 flows through diode 25 to a positive terminal 26. From terminal 26 the current flows through modulator 28 to a negative terminal 29 and through diodes 20 and 22 to windings 8 and 7, respectively.

Transformer secondary windings 12, 13 and 14 are connected in Y configuration also by having one end of each winding connected together to form junction 15. The other ends of secondary windings 12, 13 and 14 are coupled to AC input terminals 40, 42 and 44, respectively, of a second six diode full wave rectifying bridge comprising diodes 32–37. AC energy coupled from primary winding 6, 7 and 8 through core 10 to secondary windings 12, 13 and 14 therefore generate a DC voltage with some ripple at a positive terminal 46. A negative terminal of this second bridge is connected to junction 29 in common with the first bridge. Junction 29 forms the reference point for voltages in the feedback loop, such as the voltage at junction 46. The voltage at junction 46 is coupled to a comparator 48 which generates an error signal proportional to the difference between the voltage at junction 46 and an internal DC reference. The error signal is coupled to a gain module 50 which amplifies the error signal and provides sufficient power to drive modulator 28. The output of gain module 50 is coupled to the control input of modulator 28.

In operation as the voltage at junction 46 rises above the reference voltage of comparator 48, the amplified error signal from gain module 50 increases the impedance of modulator 28 and thereby reduces the current in transformer primary windings 6, 7 and 8. The current reduction in windings 6, 7 and 8 results in a corresponding reduction in the output of windings 12, 13 and 14 which lowers the voltage at junction 46. When the voltage at junction 46 drops below the comparator 48 voltage, the output of comparator 48 causes the impedance of modulator 28 to decrease allowing more primary winding current to flow to raise the junction 46 voltage. Modulator 28 may also be described as a variable impedance in series with the reflected impedance of the load coupled to secondary windings 12, 13, 14.

The control signal causes the modulator impedance to vary so that voltage across the load remains constant and all AC components of the voltage appear across the modulator.

With the feedback arrangement illustrated in FIG. 1 modulator 28 not only controls the long term DC voltage level at junction 46, but also reduces the ripple normally associated with unfiltered full wave rectified power. Thus, although modulator 28 is referred to as a DC modulator because current flows through it in only one direction, its impedance is modulated at six times the frequency of the AC energy supplied to the three phase transformer.

The voltage at junction 46 may be used as only a feedback signal to control modulator 28 or it may additionally be used as a DC voltage supply for other circuits. Additional secondary windings may be provided on the three phase transformer to provide additional DC voltage levels. All such additional DC supplies will also be regulated by the AC regulator illustrated in FIG. 1. The additional secondary windings may also be used to provide regulated AC power to motors or other equipment which require constant voltage AC input. When the AC regulator of FIG. 1 removes ripple from junction 46 voltage, it will also distort any AC output of a secondary winding. In the event that this distortion of the AC output signal is not desired, the feedback signal from junction 46 to comparator 48 may be ripple filtered to provide only a DC feedback signal so that modulator 28 would control only the average output of the three phase transformer. In this way, average AC power out can be controlled without distortion of the shape of the AC signal.

Figure 2:
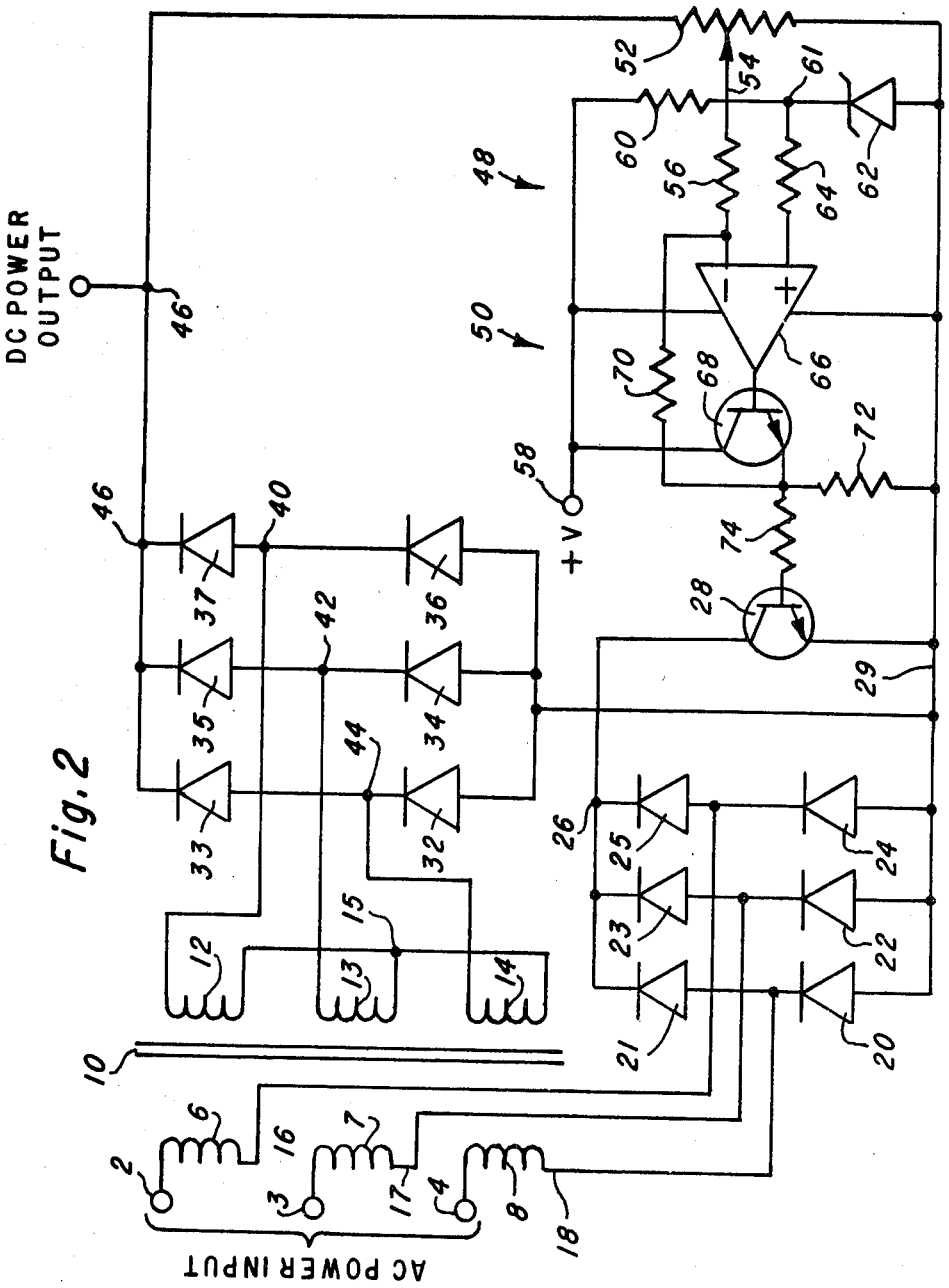
FIG. 2 is a schematic diagram of the preferred embodiment of the present invention.

FIG. 2 is a detailed schematic diagram of a regulated DC supply including a linearly modulated AC regulator according to the present invention. The designation numbers of components in FIG. 2 are the same as the designation numbers used in FIG. 1 for corresponding components. Transformer primary windings 6, 7 and 8 and rectifying bridge diodes 20–25 are interconnected in exactly the same manner as described for FIG. 1. An NPN transistor 28 is the modulator and completes the current flow path between the primary windings 6, 7 and 8. Transformer secondary windings 12, 13 and 14 are likewise interconnected with rectifier bridge diodes 32–37 in exactly the same manner as in FIG. 1. One end of a potentiometer resistor 52 is connected to junction 46. The other end of resistor 52 is connected to reference junction 29. A wiper contact 54 is at a potential between that at junction 46 and junction 29 and provides an adjustable sample of the DC output voltage at junction 46. Wiper 54 is coupled through resistor 56 to the inverting input of an operational amplifier 66. A resistor 60 is coupled from a source of DC power at input junction 58 to one end of a reference diode 62 the other end of which is connected to system reference junction 29. A positive reference voltage is thereby established at junction 61 of resistor 60 and diode 62. This reference voltage at junction 61 is coupled through a resistor 64 to the non-inverting input of operational amplifier 66. Operational amplifier 66 may be, for example, a National Semiconductor Inc. type LM 101. The output of amplifier 66 is connected to the base of a transistor 68 which provides power amplification for low power output of amplifier 66. The voltage at the emitter of transistor 68 will essentially follow the voltage output of amplifier 66. A feedback resistor 70 is coupled from the emitter of transistor 68 back to the negative input of amplifier 66 to stabilize amplifier 66 by limiting the overall loop gain. A resistor 72 coupled from the emitter of transistor 68 to junction 29 provides bias current for transistor 68. The comparator 48 of FIG. 1 essentially comprises amplifier 66 and reference diode 62 with their associated biasing and feedback networks. The gain block 50 of FIG. 1 essentially comprises transistor 68 although amplifier 66 also provides high voltage gain.

A resistor 74 couples the control signal at the emitter of transistor 68 to the base of current modulating transistor 28. The flow of current in transformer primary windings 6, 7 and 8 is proportional to the base current supplied to transistor 28 through resistor 74. The collector to emitter current of transistor 28 is essentially equal to $\beta$ times the emitter current supplied through transistor 74 in accordance with the classical transistor equations.

In operation as the voltage at junction 46 rises above the preselected value, the sample voltage at wiper 54 increases above the reference voltage at junction 61. In response to these changes, the output voltage of amplifier 66 decreases, driving the emitter voltage of transistor 68 down, decreasing the current supplied through resistor 74 to the base of transistor 28. The decrease in base current causes the collector current of transistor 28 to decrease reducing the current allowed to flow in all primary windings 6, 7 and 8. The decreased primary current then causes the transformer secondary voltages and the voltage at junction 46 to decrease. Not only does the circuit of FIG. 2 regulate the average DC values at junction 46, but it additionally decreases the ripple voltage normally associated with full wave rectified signals. Even with the three phase 400 cycle per second input signal to the transformer primary, the modulation frequency of transistor 28 is only 2400 Hz. At this relatively low modulating frequency a wide variety of modern high power transistors are suitable for use as transistor 28.

It will be apparent to those skilled in the art that the use of other modulating elements or other modulating techniques are suitable alternates to simply increasing the size of the transistor 28 where more current regulating capacity is desired. A plurality of transistors may be operated in parallel as a substitute for transistor 28 where the transistors are either matched or additional circuitry is added to insure equal current division. Switching mode drive may be applied to regulator 28 as is commonly done in the voltage regulator art to control high power levels with a small regulating element and high power efficiencies. In a switching mode regulator transistor 28 is alternately switched from a full on, or very low resistance condition, to a full off, or very high resistance condition. In either of these states, transistor 28 dissipates very little power. The output power is modulated by controlling the relative on-time to off-time of transistor 28. The base drive signals of transistor 28 are generated by converting the linear outputs from the emitter of transistor 68, or from the comparator 48 of FIG. 1, into a pulse duration modulation control signal. Switching mode regulators do not control output ripple as well as linear regulators but the control can be improved by synchronizing the off time periods of the pulse duration control signals with the voltage peaks of the AC power input signals.

It will also be apparent that the modulator control signal may be derived from sources other than the transformer secondary. For example, the AC regulator may be used simply as a switch for turning the transformer output on and off. In such a case a manual switch simply turns the modulator 28 completely on or off at the will of the operator. The AC regulator may also be used as an overload protector which responds to excessive primary winding current to disconnect power. This is accomplished by biasing modulator 28 in a full on or short circuit condition until primary currents above a preselected level are detected. Upon detecting an overload the modulator 28 is switched off and held off by a latch circuit.

Although the present invention has been shown and illustrated in terms of specific apparatus, it will be apparent that changes or modifications can be made without departing from the spirit and scope of the invention as defined by the appended claims:

What is claimed is:

1. An AC regulator for controlling the current in primary windings of a multiphase transformer comprising:
   a. a multiphase transformer having a plurality of primary and secondary Y connected windings:
   b. a full wave rectifying bridge having an AC input coupled to one end of each transformer secondary winding, said bridge having a positive terminal and a negative terminal;
   c. a full wave rectifying bridge having an AC input coupled to one end of each transformer primary winding, said bridge having a positive terminal and a negative terminal, the negative terminals of said primary and secondary rectifying bridges connected in common to form a voltage reference point;
   d. a modulator having an input terminal coupled to the positive terminal of the primary rectifying bridge, an output terminal coupled to the voltage reference point and a control input terminal; and
   e. a drive feedback circuit coupled between the positive terminal of the secondary rectifying bridge and modulator control input terminal for driving the modulator to increase or decrease the current in the transformer primary windings so that voltage across the load remains constant and the ripple in the DC output reduced.

2. An AC regulator according to claim 1 wherein the modulator is a transistor.

3. An AC regulator according to claim 1 wherein the comparator means is a differential amplifier and the internal reference is a reference diode, said diode coupled to the non-inverting input of said amplifier and said inverting input coupled to the output of detection means.

4. An AC regulator according to claim 1 wherein said feedback circuit includes a comparator, an internal DC reference voltage, and an amplifier, the comparator having a first input terminal coupled to the positive output of the secondary rectifying bridge and a second input terminal coupled to the DC reference source for producing an error signal representing the difference between the voltages at the positive output terminal of the secondary rectifying bridge and the DC reference, and an output terminal coupled to the amplifier for feeding the error signal to the amplifier for amplification into a drive signal, said drive signal coupled to the modulator control input, whereby when the voltage at the output of the secondary rectifying bridge rises or falls above or below the DC reference voltage of the comparator the drive signal drives the modulator accordingly to reduce or increase current in the transformer primary windings so that voltage across a load remains constant and the ripple in the DC output reduced.

5. An AC regulator according to claim 2, wherein the modulator transistor includes a collector, emitter and base, the collector connected to the positive terminal of the primary rectifying bridge, the emitter coupled to the reference junction, and the base coupled to the drive feedback circuit and wherein said drive feedback circuit includes a potentiometer resistor having one end connected to the positive output of the secondary rectifying bridge and its other end connected to the reference junction; a wiper contact for selectively sampling the secondary rectifying bridge output voltage; an operational amplifier having an inverting input terminal and a noninverting input terminal; a source of DC power; a reference diode having an anode and cathode; said operational amplifier having the inverting terminal coupled to the wiper contact and the noninverting terminal coupled to the junction of the source of DC power and the cathode of the reference diode; said reference diode having the anode coupled to the reference junction; and a transistor having a base coupled to the operational amplifier output terminal, a collector coupled to the source of DC power, and an emitter coupled to the junction of a feedback circuit coupled to the inverting terminal of the operational amplifier for stabilizing the operational amplifier by limiting the overall loop gain, an emitter biasing resistor coupled to the reference junction, and the base of the modulator transistor whereby the modulating transistor is driven responsively to changes in the secondary rectifying bridge output voltage to selectively change the current flowing in the primary to maintain constant the output voltage of the secondary rectifying bridge output.

* * * * *